US007199837B2

(12) United States Patent
Callway et al.

(10) Patent No.: US 7,199,837 B2
(45) Date of Patent: Apr. 3, 2007

(54) SYSTEM FOR IMPROVED RATIOMETRIC EXPANSION AND METHOD THEREOF

(75) Inventors: Edward G. Callway, Toronto (CA); David I. J. Glen, Toronto (CA)

(73) Assignee: ATI Technologies, Inc., Markham, Ontario (CA)

( * ) Notice: Subject to any disclaimer, the term of this patent is extended or adjusted under 35 U.S.C. 154(b) by 871 days.

(21) Appl. No.: 10/008,630

(22) Filed: Nov. 13, 2001

(65) Prior Publication Data

US 2003/0090592 A1 May 15, 2003

(51) Int. Cl.
*H04N 9/74* (2006.01)

(52) U.S. Cl. ........................................................ 348/581

(58) Field of Classification Search ................ 348/581, 348/441, 445, 580, 561–562; 345/667, 660; 382/298, 299, 300
See application file for complete search history.

(56) References Cited

U.S. PATENT DOCUMENTS

| | | | | | |
|---|---|---|---|---|---|
| 4,020,332 | A | * | 4/1977 | Crochiere et al. | 708/290 |
| 4,682,301 | A | * | 7/1987 | Horiba et al. | 708/308 |
| 5,335,089 | A | * | 8/1994 | Xie et al. | 358/3.03 |
| 5,351,087 | A | * | 9/1994 | Christopher et al. | 348/441 |
| 5,355,328 | A | * | 10/1994 | Arbeiter et al. | 708/313 |
| 5,574,572 | A | * | 11/1996 | Malinowski et al. | 358/451 |
| 5,768,461 | A | * | 6/1998 | Svetkoff et al. | 385/116 |
| 5,809,182 | A | * | 9/1998 | Ward et al. | 382/298 |
| 5,812,203 | A | * | 9/1998 | Swan et al. | 348/446 |
| 5,828,815 | A | * | 10/1998 | Herregods et al. | 358/1.9 |
| 5,892,694 | A | * | 4/1999 | Ott | 708/313 |
| 6,229,520 | B1 | * | 5/2001 | Clatanoff et al. | 345/611 |
| 6,339,434 | B1 | * | 1/2002 | West et al. | 345/667 |
| 6,360,023 | B1 | * | 3/2002 | Betrisey et al. | 382/260 |
| 6,385,267 | B1 | * | 5/2002 | Bowen et al. | 375/376 |
| 6,480,201 | B1 | * | 11/2002 | Fushiki et al. | 345/592 |
| 6,549,214 | B1 | * | 4/2003 | Patel et al. | 345/660 |
| 6,611,260 | B1 | * | 8/2003 | Greenberg et al. | 345/204 |
| 6,674,484 | B1 | * | 1/2004 | Boland et al. | 348/580 |
| 6,751,362 | B2 | * | 6/2004 | Slavin | 382/299 |
| 6,807,315 | B1 | * | 10/2004 | Walmsley et al. | 382/263 |
| 6,825,857 | B2 | * | 11/2004 | Harasimiuk | 345/660 |
| 2002/0158978 | A1 | * | 10/2002 | Gann et al. | 348/272 |

* cited by examiner

*Primary Examiner*—Paulos M. Natnael

(57) ABSTRACT

A system and method are described for providing an improved ratiometric expansion of video images. Source video images are set to a lower resolution than the full resolution of a pixelated display device. The source video images are up-scaled to match the display resolution of the display device. Pixels in the source video image are replicated to form a partially up-scaled video image that has frequency content well below the Nyquist rate of the image. The replicated image is then re-sampled through the use of a two-tap filter to generate a video image with the same resolution as the display device.

37 Claims, 6 Drawing Sheets

SYSTEM FOR IMPROVED RATIOMETRIC EXPANSION AND METHOD THEREOF

FIELD OF THE DISCLOSURE

The present invention relates generally to display images and more particularly to re-scaling display images.

BACKGROUND

Displays are being designed to meet high-resolution needs of consumers displaying video content from various video applications, such as digital video disk (DVD) players, multimedia video, and video games. However, not all video applications are desired to run at the maximum resolution provided by the display. For example, a consumer may prefer to set a display resolution associated with his operating system to a lower resolution than a display's maximum resolution. The lower resolution may be desired due to the increase in size of text being displayed, making it easier for consumers with poor eyesight to read the text.

Problems arise when attempting to set certain displays to display images at a lower resolution than the displays are designed for. In multisync cathode ray tube (CRT) displays, the change in image resolution setting is not problematic. Multisync CRT displays may be set to display video with a lower display resolution by altering the scanning rate of the CRT display. By decreasing the scan rate of the CRT display, lower resolution video may be supported. Pixelated displays, such as flat panel, liquid crystal displays, or digital light projectors, are fixed resolution displays. It is sometimes difficult to alter the resolution of pixelated displays. Unlike multisync CRTs, pixelated displays are fixed-format, in that an identifiable, or unique screen pixel is provided for every image pixel displayed on the display. When an image is to be presented at a lower display resolution than directly supported by a resolution the pixelated display, the image may need to be scaled up to match the resolution of the pixelated display.

Some attempts have been made to remedy the problem associated with altering the scaling of images for pixelated displays. One solution is to not rescale the display image, and leave the one-to-one relationship between image pixels and display pixels intact. Unfortunately, the result is that the image is only displayed on a portion of the display screen. The image is generally centered in the screen and small, making the effect of setting the video to a lower resolution somewhat negligible. Generally, ratiometric expansion is performed, in which attempts are made to scale the image to match the display resolution, for example by replication.

Replication is a method of replicating pixels of a source image to increase the resolution of the source image. Unfortunately, not all replicated portions of an image are proportionately increased in size. Replication works fine with some upscale factors, such as one to two where every pixel is simply replicated to two pixels. However, when the upscale factor is not an integer multiple, it is not always certain how many pixels to replicate from a single pixel. While a pixel may be replicated to a first number of pixels in one portion of the display, the pixel is replicated to a different number of pixels in another portion of the display. This artifact is especially noticeable in text and may generate unfavorable results.

Another method of scaling an image is to re-sample the image. As shown in prior art FIG. 1, a new image, closer to a preferred resolution of the display, is re-sampled from the source image. Pixels P1–P3 of a source video line 110 are re-sampled into pixels R1–R5 of a re-sampled video line 120. In the illustrated embodiment, a scale factor of 2.5× is used to generate re-sampled video line 120. Distances between pixels of the source video line 110 and corresponding pixels in the re-sampled video line 120 are measured in steps of 0.4 pixels. The distances are used to generate absolute alpha values 112. Absolute alpha values 112 may be used to generate interpolated pixels R1–R5. Source video line 110 represents a particular line of pixel values corresponding to a source video image. In one embodiment, the source video image corresponds to video generated by an information handling system for display on a pixelated display (not shown). The resolution of source video line 110 is lower than a desired resolution on a pixelated display. To get the desired image resolution, source video line 110 is re-sampled to a re-sampled video line 120, which represents source video line 110 with a 2.5 scale factor.

Each of the pixels (R1–R5) of re-sampled video line 120 may be associated with a position relative to pixels in source video line 110. The relative positions are represented through absolute alpha values 112. In the illustrated embodiment, the absolute alpha values denote a distance from the nearest left pixel in source video line 110. Pixel R1 of re-sampled video line 120 is mapped part way between pixel P1 and pixel P2; accordingly, the absolute alpha value associated with pixel R1 is 0.5. Pixel R2 is mapped close to pixel P2 but far from pixel, P1. R2 is assigned an alpha value of 0.9. Step increases between absolute alpha values assigned for a next right pixel of re-sampled video line 120 is inversely proportional with an assigned scale to be performed. For example, with a scale of 2.5×, a step in alpha value for every next pixel of re-sampled video line 120 is 1/2.5, or 0.4. Therefore, the absolute alpha value assigned to pixel R3 is 1.3; however, the '1' may be dropped to indicate pixel R3's relative distance to the nearest left pixel, P2. Therefore, the absolute alpha value associated with pixel R3 is 0.3. The absolute alpha value associated with pixel R3 is 0.7. The absolute alpha value associated with pixel R5 is taken from pixel P3, and is 0.1. The next pixel of re-sampled video line 120, pixel R6 (not shown) would be taken from pixel P3 and would be 0.5, indicating that pixel R6 may be mapped between pixels P3 and R4.

The absolute alpha values 112, indicate the relative positions of pixels R1–R5 of re-sampled video line 120 to pixels P1–P3 of source video line 110. The absolute alpha values may be used to determine the values of pixels R1–R5. Coefficients based on the absolute alpha values may be used as weights to combine the values of the relatively nearest left and right pixels. In one embodiment, taking a difference of 1 and an assigned absolute alpha value generates the coefficients. For each pixel of re-sampled video line 120, the value of the nearest left pixel of source video line 110, multiplied by the difference of 1 and the assigned alpha value, is added to the value of the nearest right pixel, multiplied by the assigned alpha value. Using the values of P1–P3 and the assigned alpha values of absolute alpha values 112, the following equations may be used to determine values for pixels R1–R5:

$R1=P1(1-0.5)+P2(0.5)=P1;$ $R2=P1(1-0.9)+P2(0.9);$ $R3=P2(1-0.3)+P3(0.3);$ $R4=P2(1-0.7)+P3(0.7);$ and, $R5=P3(1-0.1)+P4(0.1).$ Such methods of re-sampling, such as through a two-tap, bilinear re-sampler as in prior art FIG. 1, allow a lower resolution image to be up-scaled to a desired display resolution. Unfortunately, the re-sampled results may appear blurry. As rates of change associated with portions of the image being displayed reach the Nyquist rate of the image's resolution, the re-sampled representations of the portions are blurred. The Nyquist rate of the image's resolution is half of the total resolution of the image, indicating the highest possible frequency to be displayed at the resolution of the image. While most "real world" video, such as digital video disk (DVD) video, is band limited well below the Nyquist rate of the image's resolution, text is generally not. Specifically, letters such as 'w' provide rapid rates of change which become blurred and difficult to read in re-sampled images. From the above discussion, it is apparent that an improved system for scaling images for display is needed.

BRIEF DESCRIPTION OF THE DRAWINGS

Specific embodiments of the present invention are shown and described in the drawings presented herein. Various objects, advantages, features and characteristics of the present invention, as well as methods, operations and functions of related elements of structure, and the combination of parts and economies of manufacture, will become apparent upon consideration of the following description and claims with reference to the accompanying drawings, all of which form apart of this specification, and wherein:

DETAILED DESCRIPTION OF THE FIGURES

Figure 1:
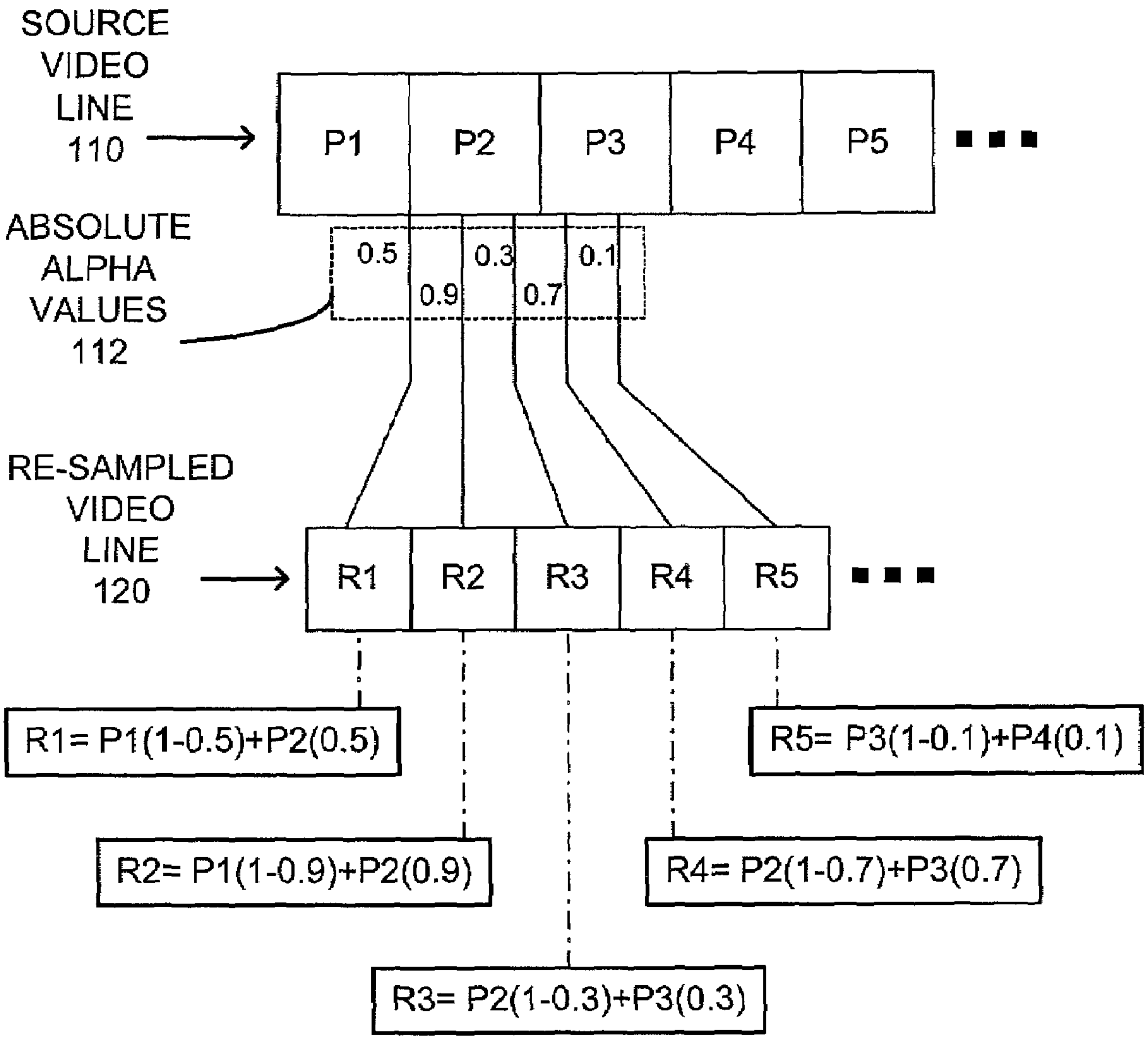
PRIOR ART FIG. 1
FIG. 1 is a diagram illustrating a line of re-sampled video pixels generated from a line of source video pixels using prior art techniques.

A least one embodiment of the present invention provides for a method of generating an improved video ratiometric expansion. The method includes receiving a first set of pixel values of a portion of a first image frame at a first resolution. The first set of pixel values represent a first pattern with a first rate of change. The first image frame may be associated with a video image from an information handling system to be presented on a pixelated display. In one embodiment, the first resolution is less than the resolution of the pixelated display. The method includes replicating pixel values from the first set of pixel values to generate a second set of pixel values. The second set of pixel values represent the first pattern with a second rate of change, less than the first rate of change. The method further includes re-sampling the second set of pixel values to generate a portion of a second image frame. The second image frame represents the first image frame at a second resolution, different from the first resolution. In one embodiment, the second resolution is of the same resolution as the pixelated display, allowing pixels of the second image frame to be displayed directly with pixels of the pixelated display.

Another embodiment of the present invention provides for a method of re-sampling a video image. The method includes receiving an absolute alpha value. The absolute alpha value represents a position, within a first range of alpha values, of a re-sampled pixel relative to a first source pixel. In one embodiment, the first range of alpha values is from zero to one, wherein a value of zero represents the closest proximity to the first source pixel and one represents a farthest distance from the first source pixel and a closest proximity to a second source pixel. In one embodiment, the method includes subtracting a first value, such as 0.5, from the absolute value to generate a shifted alpha value. Negative values of the shifted alpha values indicate closer proximity of the re-sampled pixel to the first source pixel than the second source pixel. The method also includes amplifying the shifted alpha value by a factor to generate an amplified alpha value. The amplified alpha value exaggerates a proximity to either the first or the second source pixel. The method includes normalizing the amplified alpha value to generate a normalized alpha value. The amplified alpha value is normalized to a position within the first range of alpha values.

In one embodiment, normalizing the amplified alpha value includes clipping the amplified alpha value to a second range of alpha values to generate a clipped alpha value. Amplified alpha values outside the second range of alpha values are locked to remain within the second range of alpha values. In one embodiment, the second range of alpha values includes the range of alpha values from −0.5 to 0.5. Clipping the amplified alpha values will allow values of either the first or second source pixels to be replicated during re-sampling. The method further includes adding the first value to the clipped alpha value to generate a modified alpha value. Representations of the modified alpha value may then be applied to values of the first and second source pixels to generate the re-sampled pixel.

Figure 2:
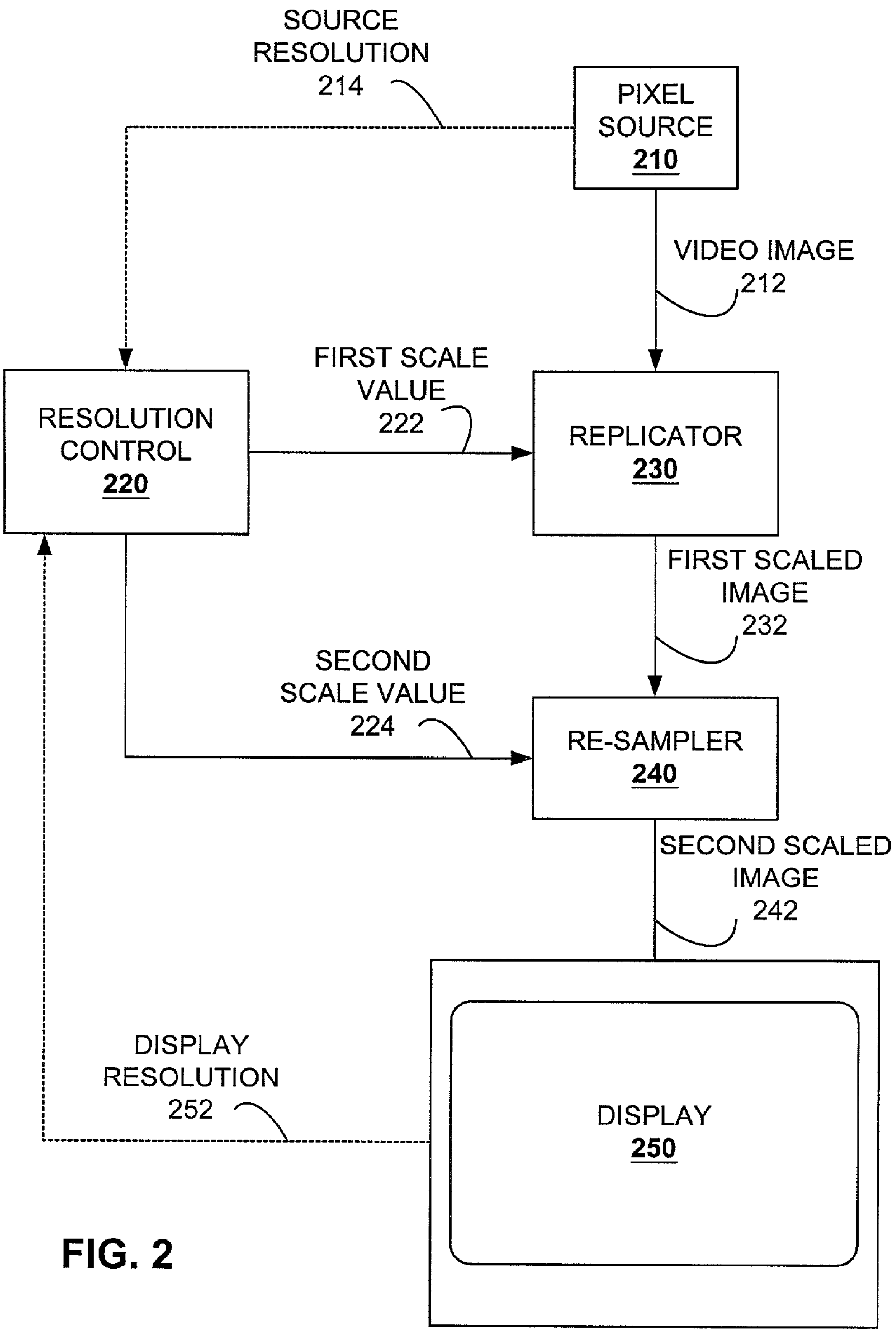
FIG. 2 is a block diagram illustrating a system for providing improved image scaling for presentation on a pixelated display, according to one embodiment of the present invention.

Referring now to FIG. 2, a block diagram illustrating a system for providing improved image scaling for presentation on a pixelated display is shown, according to one embodiment of the present invention. Pixels associated with a first image to be displayed are read from a pixel source 210. Replicator 230 replicates the pixels to generate a first scaled image 232, according to a first scale value 222. A re-sampler 240 is used to generate a second scaled image 242 from the first scaled image 232, according to a second scale value 224. The second scaled image 242 is presented through a pixelated display, such as display 250, at a desired resolution, greater than the resolution of video image 212. In one embodiment the desired resolution may be a maximum resolution available through display 250; however, it should be appreciated that the desired resolution may be less than or greater than the maximum resolution available through display 250. It should be noted that if the desired resolution is greater than the maximum resolution of display 250, the image being displayed may be clipped, allowing only a portion of the image to be presented on display 250.

Computer video, such as text and graphics to be displayed on a computer display, may not match the resolution of the computer display, such as display 250. A resolution indicates the amount of pixels used to represent an image. For example, a particular video image may be represented by a resolution of 800×600 pixels, indicating 800 pixels in a horizontal direction and 600 pixels in a vertical direction. A display's resolution indicates the maximum amount of image pixels used to display images on the screen. For example, a display with a display resolution of 1280×1024 is capable of displaying images using up to 1280 image pixels in the horizontal direction and 1024 image pixels in the vertical direction when using the full screen of the display. Multisync CRT displays may be set to handle video associated with lower resolutions by altering the scanning rates of the CRT displays. However, pixelated displays, such as display 250, have a fixed screen resolution that cannot be altered. To display video of a lower resolution on display 250, the video itself must be up-scaled to match the resolution of display 250. The up-scaling of a video image to match a display resolution is known as ratiometric expansion. Replication and re-sampling are two techniques used to handle ratiometric expansion.

Replication is used to replicate some of the pixels within the video image 212 to generate a new image of the same resolution as a display, such as display 250. However, when the up-scale ratio is not an integer, not all pixels are replicated equally and the resulting video may include anomalies. Such anomalies are especially common with text which, when replicated, may have some lines thicker than others.

Instead of replication, re-sampling may be used. In re-sampling, pixels in an up-scaled representation of an original video image are interpolated from the pixels in the original video image, such as video image 212. Interpolation is a process of generating new pixel values based on a relative distance to pixels in the original video image. The original video image was sampled at a first resolution. In re-sampling, the original video image is sampled to generate a new image with a different resolution. Re-sampling works fine for most graphics; however, as the frequency of the pixel values in the original image approach the Nyquist frequency of the total resolution of the original image, such as occurs with text characters, the up-scaled, re-sampled, image appears blurry and the text characters may become indistinguishable. However, replication, such as performed through replicator 230, lowers the frequency of the original image well below the Nyquist rate, allowing re-sampling to be performed, such as through re-sampler 240, without the blurriness resulting from re-sampling being performed alone. It should be noted that the term frequency is used to refer to a rate of change in pixel characteristics. The rate of change may include a rate of change in intensity and/or color.

Video to be displayed, such as video image 212, is generated from a pixel source 210. Pixel source 210 may include a collection of video images being generated through a local operating system within an information handling system (not shown). Video image 212 may also include video related to a digital television source. Pixel source 210 may also include video images generated through video graphics hardware (not shown) for presentation through a display device, such as display 250. Pixel source 210 may generate graphics and text to be displayed from video image 212. Pixel source 210 may also include video generated through a multimedia source, such as a digital television receiver or a digital video disk (DVD) player.

In one embodiment, video image 212, generated through pixel source 210, is presented at a lower resolution than display 250. A resolution control 220 is provided to configure replicator 230 and re-sampler 240 to generate an up-scaled image 242, to match the resolution of display 250. In one embodiment, resolution control 220 is part of a software application to prepare video output to display 250. A user may select a particular video resolution for displaying video. Since the set resolution may be different from the resolution of display 250, resolution control 220 may need to determine the resolution of display 250, display resolution 252. Resolution control 220 may communicate with display 250 and receive display resolution 252 through a connection of display 250 with an information handling system (not shown). Alternatively, a user or application may specify a display resolution 252 different from the full resolution available through display 250. As previously discussed, display resolution 252 may be less than the full resolution of display 250. It may not be desired for second scaled image 242 to fill the screen of display 250. Display resolution may also be greater than the full resolution of display 250; however, portions of second scaled image 242 may then be lost due to clipping or over-scanning.

Resolution control 220 compares the resolution of video image 212, source resolution 214 from pixel source 210, with display resolution 252 to determine a total scaling to be performed on video image 212 to achieve display resolution 252. The total scaling may be broken down into a set of scaling factors, as identified through first scale value 222 and second scale value 224. The scale values 222 and 224 are applied to replicator 230 and re-sampler 240, respectively.

For example, if the value display resolution 252 is six times the value of source resolution 214, video image 212 should be scaled by a factor of six. Since the total scale factor is 6×, the first scale value 222 and the second scale value 224 may respectively be assigned values so that the product of first scale value 222 and second scale value 224 equal the total scale factor. For example, first and second scale values 222 and 224 may respectively be set to values of 2× and 3×, 3× and 2×, or 2.5× and 2.4×. Alternatively, first scale value may be greater than the total resolution and second scale value 224 may indicate a form of downscaling to be performed through re-sampler 240. For example, first scale value 222 may equal 8×; while, second scale value may equal 0.75×.

As previously discussed, replicator 230 effectively reduces the frequency of content in video image 212, while scaling video image 212 by a factor defined by first scale value 222. Replicator 230 replicates pixels within video image 212 to generate first scaled image 232. First scaled image 232 is a representation of video image 212 with a resolution equivalent to the resolution of video image 212 multiplied by first scale value 222. The frequency components of video image 212 are effectively reduced by a factor equivalent to the inverse of first scale value 222. For example, if first scale value 222 equals 2×, the frequency components of video image 212 are reduced by ½ in first scaled image 232.

Re-sampler 240 is used to scale first scaled image 232 into second scaled image 242. Second scaled image 242 is representative of first scaled image 232 with a resolution equivalent to the resolution of first scaled image multiplied by second scale value 224. Re-sampler 240 interpolates among pixel values of first scaled image 232 to generate pixels in second scaled image 242, dependent on a relative position to pixels mapped from first scaled image 242, as described in reference to prior art FIG. 1. The relative distance may be used to generate alpha blend values. In one embodiment, the alpha blend values are modified, as described in reference to FIG. 4, to effectively perform the process of replicating video image 212, in place of replicator 230. The resultant image, second scaled image 242, generated by re-sampler 240, is of a greater resolution than video image 212, as defined by display resolution 252. Second scaled image 242 may then be presented through display 250. While display 250 is described in reference to a pixelated display, it should be appreciated that the present invention may be used with other types of display outputs. For example, display 250 may include digital light projectors or CRT displays.

Figure 3:
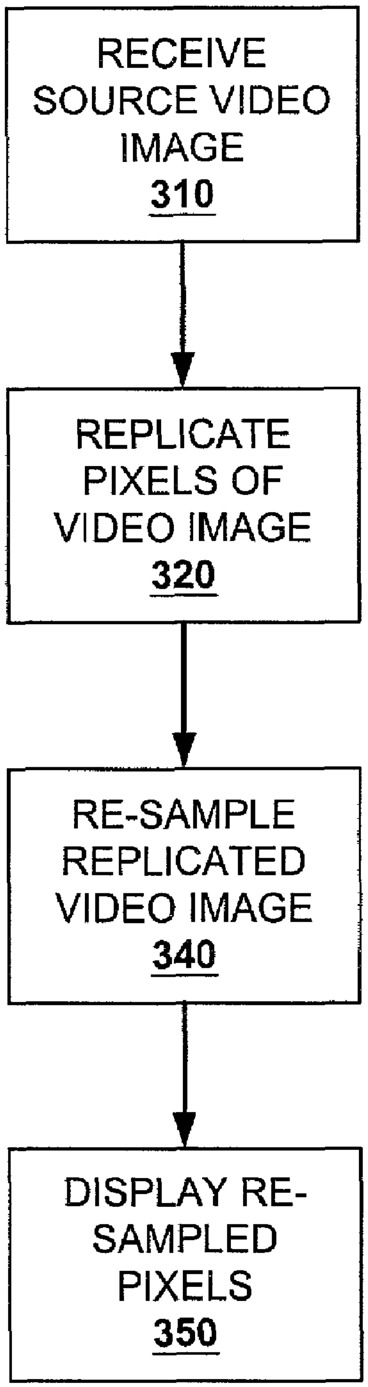
FIG. 3 is a flow diagram illustrating a method for improved image scaling for display on a pixelated display.

Referring now to FIG. 3, a flow diagram illustrating a method for improved image scaling is shown, according to one embodiment of the present invention. Video to be presented on a pixelated display is generated at a resolution smaller than a desired output resolution. To use more of the screen size of the pixelated display, the source video images must be scaled to a new video image with a greater resolution. In one embodiment, the desired output resolution is the full resolution available through the pixelated display.

In step 310, a set of image pixels is received. In one embodiment, the set of image pixels are related to a video image generated through an information handling system. A user may select the resolution of the video to be displayed. As previously discussed, the resolution of the video image may be less than a desired output resolution. A total scale is determined for scaling the received video image to the desired output resolution. In step 320, pixels from the video are replicated to generate a replicated video image scaled to a first portion of the full scale needed to match the desired output resolution. As previously discussed, replication allows a frequency related to the rate of change of the received video image to be reduced well below the Nyquist rate of the replicated video image.

In step 340, the replicated video image is re-sampled to generate a re-sampled video image scaled to a second portion of the full scale needed to match the desired output resolution. The first and second portions of the full scale multiply to form the full scale. Re-sampling is performed by interpolated pixel values between the pixel values in the replicated video image. Alpha values are generated to apply a weight to pixel values in the replicated video image to interpolate new pixel values in the replicated video image. In one embodiment, the alpha values are modified to generate alpha coefficients. The alpha coefficients are multiplied and clipped to allow replication to effectively be performed during the process of re-sampling, as will be discussed further in reference to FIG. 4. In one embodiment, the resolution of the re-sampled video image is of the full resolution of the pixelated display; however it should be appreciated that the resolution of the re-sampled video image may be less than or greater than the full resolution of the pixelated display. Pixels in the re-sampled video image are capable of being mapped directly to pixels in the pixelated display. In step 350, the re-sampled video image is presented through an output device, such as the pixelated display. The steps described herein may be performed through software run on a computer readable medium, as well as through hardware.

Figure 4:
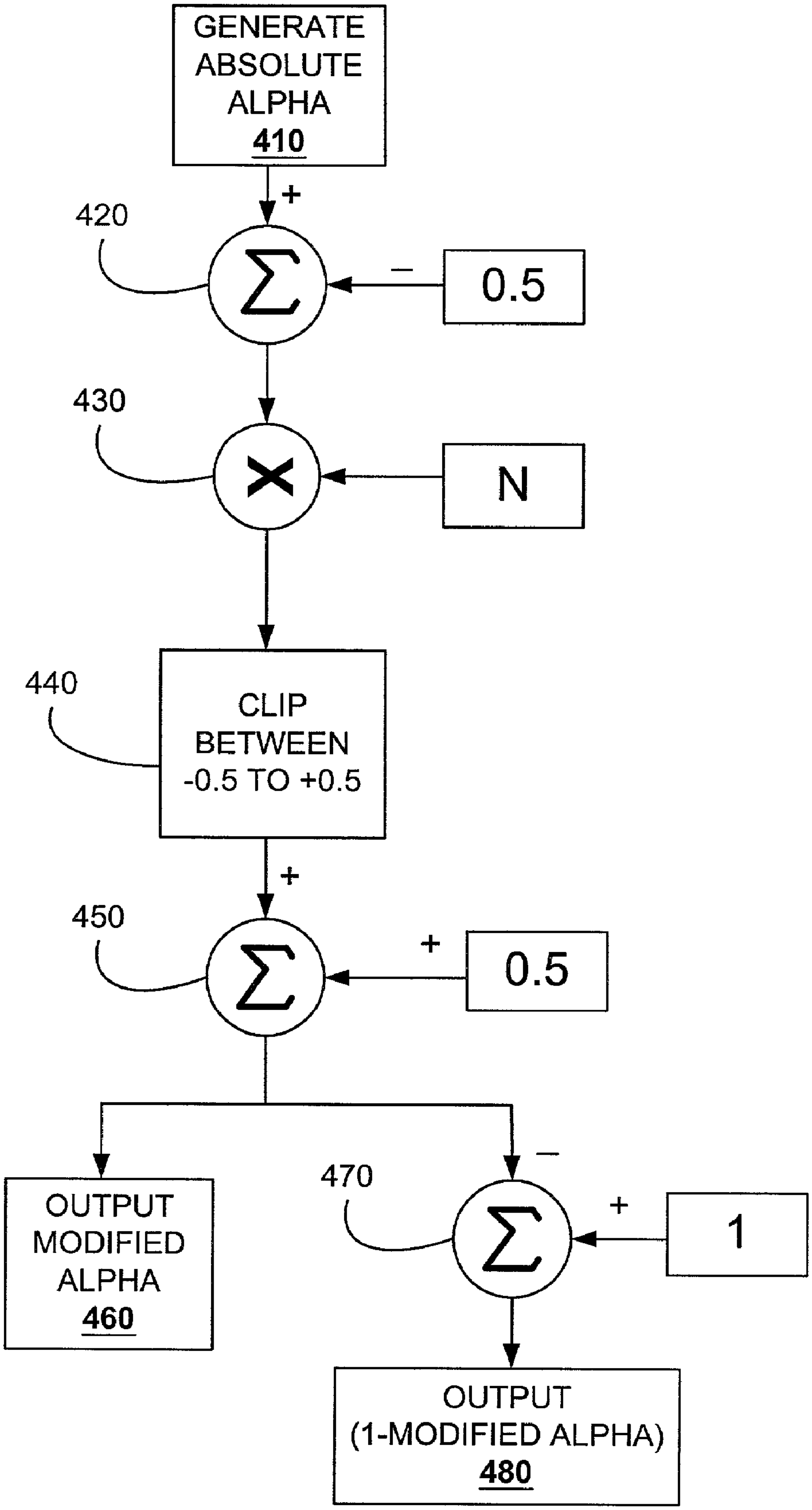
FIG. 4 is a flow diagram illustrating a method for adapting an alpha value to replicate image pixels during image re-sampling, according to one embodiment of the present invention.

Referring now to FIG. 4, a flow diagram illustrating a method for adapting an alpha value to replicate image pixels during image re-sampling is shown, according to one embodiment of the present invention. As previously discussed in reference to prior art FIG. 1, absolute alpha values are generated dependent on a position of a pixel of a re-sampled video image being generated in relation to pixels in a source video image. The absolute alpha values, or blend values, are used to determine portions of image pixel values to blend, or combine, in generating new pixel values. The absolute alpha values are modified to allow replication to effectively be performed while re-sampling the source video image into the re-sampled video image.

In step 410, an absolute alpha value is generated. The absolute alpha values represent relative steps in distance from pixels in the source video image. In one embodiment, an accumulator is used to track the position of the pixels in the re-sampled video image in relation to the source video image, as discussed further in reference to FIG. 6. The absolute aloha values are within a first range of alpha values. In one embodiment, the first range of alpha values is from zero to one. Values closer to zero than one indicate proximity to the nearest left pixel of the source video image and a value closer to one than zero indicates proximity to the nearest right pixel of the source video image. It should be appreciated that reference to values ranging from zero to one indicate a specific embodiment of the present invention and other value ranges may be used for alpha values without departing from the scope of the present invention. Furthermore, while reference is made to a nearest left and right pixel for scaling in a horizontal direction, positions may also include positions relative to a nearest upper or lower pixel for vertical pixel scaling. In step 420, a first value, 0.5, is subtracted from the absolute alpha value. The subtraction has the effect of making alpha values that indicate proximity to a left pixel of source video image a negative value. The alpha values that indicate proximity to a right pixel are left positive.

In step 430 the new alpha value is amplified by a factor of N, generating an amplified alpha value. In one embodiment, the new alpha value is multiplied by N to generate the amplified alpha value. Amplifying the alpha value exaggerates the proximity to the left or right pixels, indicated by the alpha values, and alters the range of values represented by the alpha values. Values that indicate closer proximity to a left or right pixel should be magnified to below −0.5 or above +0.5, respectively. Amplified alpha values that indicate proximity to being directly between the left and right pixels should remain within −0.5 and +0.5. Through steps 440 and 450, the alpha values are normalized to once again represent positions within the first range of alpha values. In step 440, the amplified alpha value is clipped within a second range of alpha values. In the illustrated embodiment, the second range of alpha values includes the alpha values between −0.5 and +0.5. An amplified alpha value less than −0.5 is set to approximately −0.5. An amplified alpha value greater than +0.5 is set to approximately +0.5. In step 450, the first value, 0.5, is added to the clipped alpha values to regenerate the relationship of values using the first range of alpha values, generating a normalized alpha value. Accordingly, normalized alpha values generated through step 450 represent positions using alpha values closer to zero than one to indicate proximity to the left pixel and alpha values closer to one than zero to indicate proximity to the right pixel. It should be noted that the values used may be approximated dependent on a numeric resolution of a processor or components used to generate the alpha values. For example, a number of bits used to represent the alpha values may dictate how close the alpha values are to the true values of the alpha values.

The amplification in step 430 in conjunction with the clipping in step 440 has the effect of limiting the range of values not set to either zero or one in step 450. The range of values not set to zero or one is limited to a range of values originally near 0.5, indicating a position halfway between the left and right pixels in the source video image. By increasing the value used as N in step 430, the range of values not set to zero or one is reduced. By reducing the range of values, an effect of replicating the pixels of the source video image in the re-sampled video image is increased, leading to sharper edges in the re-sampled video image. By reducing the value used for N, the amount of replicated pixels is decreased, allowing for more interpolation and smoother transitions between pixels. In step, 460, the alpha value resulting from step 450 is output as a modified alpha coefficient, which can be used for purposes of generating the re-sampled video image. In step 470, a difference between one and the modified alpha coefficient is output and used in generating the re-sampled video image, as discussed in reference to FIG. 6.

In steps 460 and 470, the modified alpha value generated through step 450 is directly used for generating alpha value coefficients, the modified alpha coefficient and the difference of one and the modified alpha coefficient. It should be noted that other methods of generating alpha value coefficients from the modified alpha values may also be used. For example, the modified alpha values generated through step 450 may be used to select alpha coefficients from a set of coefficients stored in memory, such as read-only memory, or random access memory. The modified alpha values may also be provided to an alpha coefficient generator to generate alpha coefficients. The illustrated embodiment describes providing two sets of alpha coefficients, output through step 460 and 480, such as in a two-tap bilinear re-sampler, or filter. It should be noted that other multi-tap re-samplers, using more than two taps, may be used without departing from the scope of the present invention. Accordingly, several coefficients may need to be generated from the modified alpha value generated through step 450. As previously discussed, the coefficients may be generated through a coefficient generator or read from memory using the modified alpha value from step 450.

In one embodiment, the coefficients generated through the steps described in FIG. 4 are used to scale images. The images may include static images as well as video images. In one embodiment, the steps described in FIG. 4 are performed as part of operations within an image or video scalar in which received images received with a source resolution are scaled to match a desired output resolution. It should be noted, pixels related to the edge of a screen or video line, may be treated differently to account for the edge of the screen. In one embodiment, pixels corresponding to an edge of a display screen use values representing black pixels to account for non-existent pixels beyond the edge of the screen, during re-sampling. Alternatively, the original source pixels on the edge may be replicated to account for the non-existent pixels beyond the edge of the screen. Furthermore, while the methods described herein refer to processing pixels in one direction, such as a horizontal line of video, the methods descried herein may similarly be performed on a set of vertical video lines (not shown). Furthermore, while the mathematical steps illustrated in FIG. 4 describe one method of generating modified alpha values, it should be noted that mathematical variants may be employed to generate equivalent modified alpha values without departing from the scope of the present invention.

Figure 5:
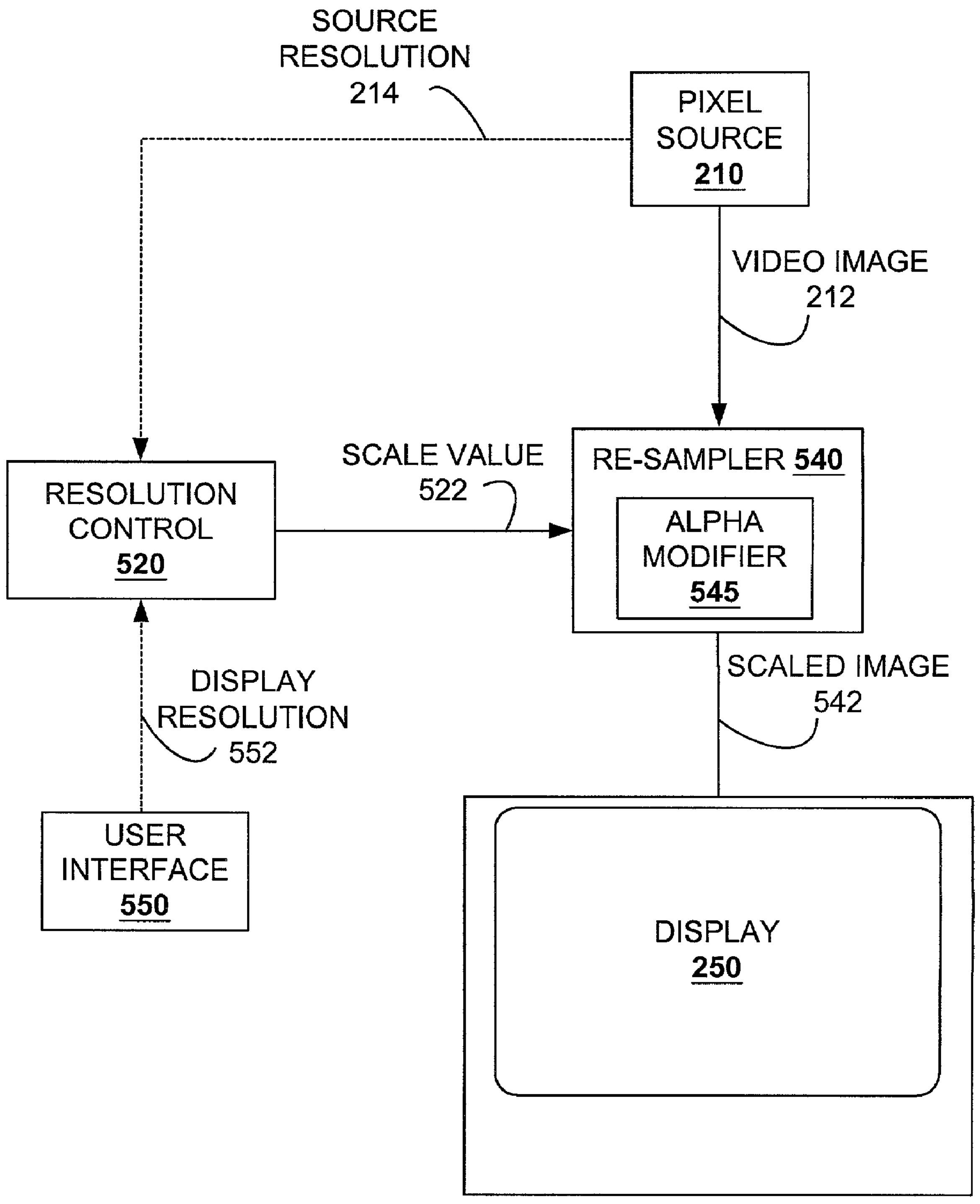
FIG. 5 is a block diagram illustrating a system for providing improved image scaling through re-sampling, according to one embodiment of the present invention.

Referring now to FIG. 5, a block diagram illustrating a system for providing improved image scaling through re-sampling is shown, according to one embodiment of the present invention. A pixel source 210 generates a video image 212 at a first resolution, source resolution 214. The image is scaled by a factor, scale value 522, through a re-sampler 540. Re-sampler 540 performs re-sampling on video image 212 to generate a scaled image 542. Scaled image 542 represents video image 212 at the scale factor defined by scale value 522. The scaled image 542 is presented through a display device, such as display 250.

As previously discussed in reference to FIG. 2, video image 212 of pixel source 210 may include video images generated through video graphics hardware (not shown) for presentation through a display device, such as display 250. Video image 212 may also include video generated through a multimedia source (not shown), such as a digital television receiver or a digital video disk (DVD) player. In one embodiment, video image 212 is provided at a source resolution 214 which is less than a desired resolution, display resolution 552. To provide video image 212 at display resolution 552, re-sampling is performed, such as through re-sampler 540. In one embodiment, a scale factor, scale value 522, is provided to re-sampler 540 to indicate a resolution for scaled image 542. The scale value 522 is determined through resolution control 520.

In one embodiment, resolution control 520 is used to determine a scale value 522 to apply to video image 212, through re-sampler 540. Resolution control 520 compares source resolution 214 to a desired resolution, display resolution 552. In one embodiment, display resolution 552 is determined through a user interface 550. User interface 550 may include a graphical user interface used to allow a user to select an output resolution. The user interface 550 may also include a set of switches set by a user. Alternatively, display resolution 552 may be automatically determined through software. For example, in one embodiment, display resolution 552 is set to be similar to a resolution of display 250. It should be noted that display resolution 552 may be set to values less than or greater than the resolution of display 250. It should be noted that if display resolution 552 is set to a greater resolution than the resolution of display 250, image cropping may occur. Resolution control 520 determines a factor needed for source resolution 214 to match display resolution 552. Resolution control 520 provides a scale value 522, similar to the determined factor. In one embodiment, display resolution 552, source resolution 214 and scale value 522 include both a horizontal component for scaling in a horizontal direction and a vertical component for scaling in a vertical direction. Accordingly, resolution control 520 may use the horizontal components of source resolution 214 and display resolution 552 to determine the horizontal component of scale value 522. Resolution control 520 can then use the vertical components of source resolution 214 and display resolution 552 to determine the vertical component of scale value 522.

Re-sampler 540 re-samples video image 212 according to scale value 522 to generate scaled image 542. Re-sampler 540 interpolates pixels in scaled image 542 to approximate pixels of video image 212. In one embodiment, re-sampler 540 generates absolute alpha values dependent on the location of pixels to be interpolated and pixels of video image 212. In one embodiment, an alpha modifier 545 is used to generate modified alpha coefficients, as discussed in reference to FIG. 4. The modified alpha coefficients are then used to generate the interpolated pixels of scaled image 542. The modified alpha values force interpolated pixels near associated pixels of video image 212 to match the associated pixels. Accordingly, a form of pixel replication is performed through the modified alpha values. In one embodiment, the scaled image 542 is provided for presentation on display 250. Alternatively, the scaled images may be output through other devices, such as a printer, or stored in memory. As previously discussed, scale value 522 may include both a horizontal component and a vertical component. Accordingly, both component of scale value 522 maybe used to generate scaled image 542.

Figure 6:
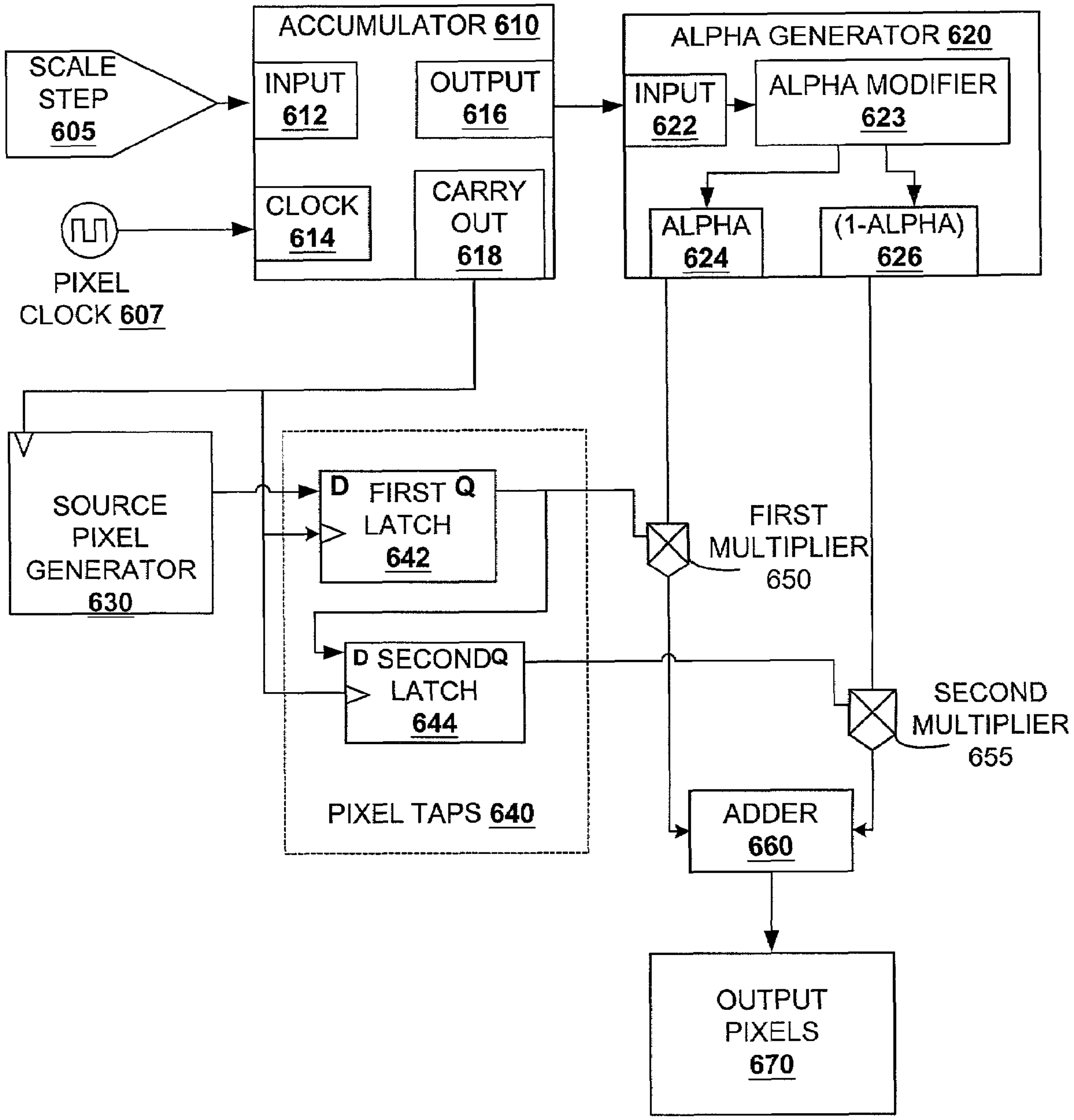
FIG. 6 is a block diagram illustrating a system for re-sampling image pixels for presentation on a pixelated display, according to one embodiment of the present invention.

Referring now to FIG. 6, a block diagram illustrating a system for re-sampling image pixels for presentation on a pixelated display is shown, according to one embodiment of the present invention. Source pixel generator 630 generates sets of pixels related to a source video image The source video image is of a resolution less than a desired output video. The source video image is scaled for output as output pixels 670 which are of the desired image resolution. Pixel values from source pixel generator 630 are stored in pixel taps 640. An accumulator 610 and alpha generator 620 are used to generate alpha coefficients for combining the pixel values stored in pixel taps 640 and generating a set of output pixels 670.

Accumulator 610 is used to track the position of pixels being output across a line of output video pixels, such as output pixels 670. A scale step 605 is provided at input 612 of accumulator 610. Scale step 605 provides a step increment for determining an absolute alpha value, as described in reference to prior art FIG. 1. For example, if the scale ratio needed by the source image, as is formed through source pixel generator 630, to generate an output image is 2.5×, the step needed for each new absolute alpha value is 0.4. Accordingly, 0.4 would be provided to input 612, through scale step 605. A pixel clock 607 is provided to clock input 614 of accumulator 610 to indicate a new pixel must be generated for display. In one embodiment, pixel clock 607 is related to a pixelated display used for presenting output pixels 670. For every pulse of pixel clock 607, scale step 612 is added to a current value stored in accumulator 610. It should be appreciated that while pixel clock 607 is described for increasing the current value stored in accumulator 610 in the illustrated embodiment, other forms of increasing the current value or applying scale step 612 may be used without departing from the scope of the present invention.

In one embodiment, accumulator 610 is a fractional accumulator in which only the fractional component of the value stored in accumulator 610 is output, through output 616. However, every time accumulator 610 sums a value greater than one, a carry bit is set and output through carry out 618, while the fractional component continues to be output through output 616. A signal generated through the carry out 618 is used to trigger source pixel generator 630 to output a new pixel.

Accumulator 610 is used to track a relative position of pixels being generated to source pixels generated through source pixel generator 630. The fractional value stored in accumulator 610 indicates a relative position from the nearest left pixel in the source video image, the value of which is stored in second latch 644. The relative position is measured in fractional step units, as indicated through scale step 605. The fractional step units indicate what fraction of a pixel away the output pixel is from the original source pixel. Once the relative position has increased greater than one, the pixel to be output is greater than a pixel away from the left pixel in the source video image, indicating the nearest pixel in the source image to the left is no longer the pixel value currently stored in second latch 644. A new left pixel is to be considered in comparison to the source video image, so source pixel generator 630 is triggered by carry out 618 to output a new pixel. First and second latched 642 and 644 are also triggered by the signal from carry out 618. Second latch 644 stores the pixel value stored in first latch 642 and first latch 642 stored the value of the new pixel output from source pixel generator 630. In one embodiment, accumulator 610 is a 12-bit accumulator, of which only the top five bits are used to determine absolute alpha values.

The fractional positions are provided as absolute alpha values to input 622 of alpha generator 620, through output 616. The alpha values are modified by alpha modifier 623 to effectively replicate pixels of source pixel generator 630 when the output pixel to be generated is relatively close to a pixel of the source video image, as described in reference to FIG. 4. Alpha modifier 623 modifies the absolute alpha values to generate alpha coefficients output through alpha output 624 and '1-alpha' output 626. In one embodiment, the alpha coefficients received through outputs 624 and 626 are applied to source pixel values stored in first latch 642 and second latch 644 of pixel taps 640. It should be noted that alpha generator 620 is used to generate and modify two sets of alpha coefficients. While the modified alpha values are output directly as alpha output 624 and a difference of one and the alpha values is are output through '1-alpha' output 626, other methods of generating alpha coefficients from the modified alpha values may be employed. For example, the modified alpha values may be compared to a table of coefficients. Coefficients in the table associated with the modified alpha values may be selected for use in multipliers 650 and 655. It should also be noted that while the illustrated embodiment describes a system for generating two sets of alpha coefficients, such as for a two-tap re-sampler, more coefficients may be generated, such as for handling other taps of a multi-tap re-sampler.

Pixel taps 640 store values representative of the source video image generated through source pixel generator 630. Pixels output through source pixel generator 630 are first stored in first latch 642. When a trigger signal is received from carry out 618, a new pixel value is stored in first latch 642, and the old pixel value from first latch 642 is then stored in second latch 644. In one embodiment, first and second latches 642 and 644 represent pixel taps for respectively tracking a relative right and a left pixel value for comparison in generating output pixels 670. It should be appreciated that while pixel taps 640 is described as using two latched for storing two pixel values, other latches may also be included to track values of more than two pixels. For example, pixel taps 640 may include four latches to use values associated with four source pixels at one time in generating output pixels 670. It should be noted that if more taps are used, more alpha coefficients may need to be generated. The alpha coefficients may be provided through a table of coefficients values, as previously discussed.

An alpha coefficient provided through alpha output 624 is multiplied with the pixel value stored in first latch 642, through first multiplier 650. Similarly, a coefficient output through '1-alpha' output 626 is multiplied with the pixel value stored in second latch 644, through second multiplier 655. The outputs from multipliers 650 and 655 are combined through an adder 660. The combined values are then output through output pixels 670. Output pixels 670 may provide the generated pixel values to a display device. In one embodiment, a resolution associated with output pixels 670 matches the full display resolution of the display device.

It should be noted that first and second latched 642 and 644 of pixel taps 640 must be pre-filled with pixel values before being used to produce output pixels 670. For example, at the start of a video line, pixel taps 640 must be filled to store useable pixel values before presenting output pixels 670. Furthermore, accumulator 610 should be reset with a start of line signal, allowing the previously stored alpha values to be cleared before processing a new line of pixels. The system described herein may be performed through multi-tap filtering. A method of re-sampling, bi-linear re-sampling, has been described in prior art FIG. 1 for generating absolute alpha values, using two original pixel values in generating new pixels. It should be noted that the embodiment described in FIG. 6 modifies the absolute alpha values, such as through alpha modifier 623, employing a method as described in reference to FIG. 4. It should be appreciated that other methods of re-sampling may be performed to generate output pixels 670 from source pixel generator, using modified alpha values, without departing from the present invention. It should be appreciated that the system for re-sampling described herein works best for scale factors greater than 1.5×. The components described herein may be performed through software, such as through a computer readable medium. Similarly, the system described may form part of a set of hardware components, such as logical circuitry used for re-sampling signals.

The systems described herein may be part of an information handling system. The term "information handling system" refers to any system that is capable of processing information or transferring information from one source to another. An information handling system may be a single device, such as a computer, a personal digital assistant (PDA), a hand held computing device, a cable set-top box, an Internet capable device, such as a cellular phone, and the like. Alternatively, an information handling system may refer to a collection of such devices. It should be appreciated that while components of the system have been described in reference to video processing components, the present invention may be practiced using other types of system components. It should be appreciated that the system described herein has the advantage of providing improved scaling for images presented on a pixelated display.

In the preceding detailed description of the embodiments, reference has been made to the accompanying drawings which form a part thereof, and in which is shown by way of illustration specific embodiments in which the invention may be practiced. These embodiments are described in sufficient detail to enable those skilled in the art to practice the invention, and it is to be understood that other embodiments may be utilized and that logical, mechanical and electrical changes may be made without departing from the spirit or scope of the invention. To avoid detail not necessary to enable those skilled in the art to practice the invention, the description may omit certain information known to those skilled in the art. Furthermore, many other varied embodiments that incorporate the teachings of the invention may be easily constructed by those skilled in the art. Accordingly, the present invention is not intended to be limited to the specific form set forth herein, but on the contrary, it is intended to cover such alternatives, modifications, and equivalents, as can be reasonably included within the spirit and scope of the invention. The preceding detailed description is, therefore, not to be taken in a limiting sense, and the scope of the present invention is defined only by the appended claims.

What is claimed is:

1. A method comprising:

receiving a first set of pixel values representing a portion of a first image frame at a first resolution, wherein the first set of pixel values represent a first pattern with a first rate of change;

generating a second set of pixel values related to the first set of pixel values to represent the first pattern with a second rate of change, wherein the second pattern is related to the first pattern and the second rate of change is less than the first; and re-sampling the second set of pixel values to generate a portion of a second image frame, wherein the second image frame represents the first image frame at a second resolution, different from the first resolution;

wherein generating the second set of pixel values includes replicating pixel values from the first set of pixel values; and wherein re-sampling the second set of pixel values includes generating alpha values to represent relative positions of pixels in the second image frame in relation to the pixels of the second set of pixel values.

2. The method as in claim 1, wherein the portion of the second image frame includes a set of image pixels representing at least a portion of a line of the first image frame.

3. The method as in claim 1, wherein the first pattern includes a portion of text.

4. The method as in claim 1, wherein re-sampling includes bi-linear re-sampling.

5. The method as in claim 1, wherein the step of re-sampling includes multi-tap filtering.

6. The method as in claim 1, wherein the second resolution is greater than the first resolution.

7. A computer readable medium tangibly embodying a program of instructions, said program of instructions comprising instructions to:

receive a first set of pixel values representing a portion of a first image frame at a first resolution, wherein the first set of pixel values represent a first pattern with a first rate of change;

generating a second set of pixel values related to the first set of pixel values to represent the first pattern with a second rate of change, wherein the second pattern is related to the first pattern and the second rate of change is less than the first; and re-sampling the second set of pixel values to generate a portion of a second image frame, wherein the second image frame represents the first image frame at a second resolution;

wherein generating the second set of pixel values includes replicating pixel values from the first set of pixel values; and wherein re-sampling the second set of pixel values includes generating alpha values to represent relative positions of pixels in the second image frame in relation to the pixels of the second set of pixel values.

8. The method as in claim 7, wherein the portion of the second image frame includes a set of image pixels representing at least a portion of a line of the first image frame.

9. The method as in claim 7, wherein the first pattern includes a portion of text.

10. The method as in claim 7, wherein re-sampling includes bi-linear re-sampling.

11. The method as in claim 7, wherein re-sampling includes multi-tap filtering.

12. The method as in claim 7, wherein the second resolution is greater than the first resolution.

13. A system comprising:

a first input to receive a first set of pixel values of a first image frame at a first resolution, wherein the first set of pixel values represent a first pattern with a first rate of change;

a replication unit to replicate pixel values from the first set of pixel values to generate a second set of pixel values, wherein the second set of pixel values represent the first pattern with a second rate of change, less than the first rate of change; and a re-sampler to re-sample the second set of pixel values to generate a portion of a second image frame based on alpha values representative of relative positions of pixels in the second image frame in relation to the pixels of the second set of pixels, wherein the second image frame represents the first image frame at a second resolution.

14. The system as in claim 13, wherein said replication unit performs replicates pixel values according to an integer scale value.

15. The system as in claim 13, wherein said first input includes a set of latches to store said first set of pixel values.

16. The system as in claim 13, wherein said re-sampler includes a multi-tap filter to interpolate said second image frame from said second set of pixel values.

17. The system as in claim 13, wherein said second resolution is greater than said first resolution.

18. The system as in claim 13, further including a pixelated display to display the second image frame, wherein a display resolution associated with the pixelated display is equivalent to the second resolution.

19. A method comprising:

receiving an absolute alpha value, wherein the absolute alpha value represents a position, within a first range of alpha values, relative to a first source pixel;

amplifying the absolute alpha value by a factor to generate an amplified alpha value;

normalizing the amplified alpha value to generate a normalized alpha value so that the normalized alpha value represents a position of a re-sampled pixel relative to the first range of alpha values; and generating a re-sampled pixel by applying the normalized alpha value.

20. The method as in claim 19, farther including:

subtracting a first value from the absolute alpha value before the step of amplifying the alpha value by a factor, wherein negative values of the alpha value, after subtracting the first value, indicate closer proximity of the re-sampled pixel to the first source pixel than a second source pixel; and further wherein normalizing the amplified alpha values includes:

clipping the amplified alpha value within a subset of alpha values to generate a clipped alpha value, wherein amplified alpha values outside of the subset of alpha values are set to a nearest limit of the subset of alpha values; and adding the first value to the clipped alpha value to generate the normalized alpha value.

21. The method as in claim 20, wherein the first value is approximately 0.5.

22. The method as in claim 21, wherein the subset of alpha values include the range of alpha values from −0.5 to approximately +0.5.

23. The method as in claim 19, further including applying a first representation of the modified alpha value to a value associated with the first source pixel and applying a second representation of the modified alpha value to a value associated with a second source pixel to generate a value for the re-sampled pixel.

24. The method as in claim 23, wherein the second representation of the modified alpha value is the modified alpha value and the first representation of the modified alpha value is the difference between one and the modified alpha value.

25. The method as in claim 23, wherein applying includes multiplying.

26. The method as in claim 19, wherein steps in position away from the first source pixel are measured by values equivalent to an inverse of a scale ratio to be performed in generating the re-sampled pixel.

27. The method as in claim 19, wherein the first range includes a range of alpha values from zero to one.

28. The method as in claim 20, wherein the first source pixel is the nearest left pixel to the relative position of the re-sampled pixel and the second source pixel is the nearest right pixel to the relative position of the re-sampled pixel.

29. The method as in claim 19, wherein the method is performed using a multi-tap filter.

30. The method as in claim 29, wherein the multi-tap filter further includes a two-tap filter.

31. The method as in claim 19, wherein the first source pixel includes an image pixel and the normalized alpha value is used to generate a scaled image pixel associated with the first source pixel.

32. The method as in claim 19, wherein the method is performed as part of operations within an image scalar.

33. A system comprising:

a first latch to store a first pixel value, said first latch including:

an input coupled to an output of a pixel source to receive said first pixel value from a first set of pixel values;

an output coupled to:

an input of a second latch; and a first input of a first multiplier;

said second latch to store a second pixel value, said second latch including:

an input to receive said second pixel value from said first latch;

an output coupled to a first input of a second multiplier;

said first multiplier to multiply said first pixel value by a first modified alpha coefficient and generate a first product, said first multiplier including:

said first input coupled to said output of said first latch;

a second input coupled to a first output of an alpha modifier to receive said first modified alpha coefficient;

an output coupled to a first input of an adder;

said second multiplier to multiply said second pixel value by a second modified alpha coefficient to generate a second product, said second multiplier including:

said first input coupled to said output of said second port;

a second input coupled to a second output of said alpha modifier to receive said second modified alpha coefficient;

an output coupled to a second input of said adder;

an alpha coefficient modifier to limit absolute alpha coefficients proximate to an edge of a range associated with the absolute alpha coefficients to the edge, said absolute alpha coefficients proximate to an edge to be used in said first multiplier and said second multiplier to represent replications of pixels from said pixel source;

a pixel source to provide said first set of pixel values of a first image frame, wherein said set of pixel values represent a pattern at a first resolution;

an accumulator to generate said absolute alpha coefficients, wherein said alpha coefficients are representative of a relative distance between an interpolated pixel and a first pixel associated with said first pixel value; and said adder to combine said first product and said second product to generate an interpolated pixel value, said adder including;

said first input to receive said first product;

said second input to receive said second product; and an output to provide said interpolated pixel value, wherein said interpolated value represents a pixel value of second set of pixel values, wherein said second set of pixel values represent said pattern at a second resolution.

34. The system as in claim 33, wherien said second resolution is greater than 1.5 times the resolution of said first resolution.

35. The system as in claim 33, further including a pixelated display to display pixels associated with said second set of pixel values.

36. A method comprising:

receiving an absolute blend value, between zero and one, associated with a relative distance between a first pixel and a second pixel;

subtracting 0.5 from the absolute blend value to generate a shifted blend value;

multiplying the shifted blend value by a factor to generate an expanded value;

clipping the expanded value between −0.5 to +0.5 to generate a fixed value;

adding 0.5 to the fixed value to generate a modified blend value;

applying the modified blend value to the value of the first pixel to generate a first portion of a Previously Presented pixel value;

applying a difference between one and the modified blend value to the second pixel to generate a second portion of the Previously Presented pixel value; and combining the first portion of the Previously Presented pixel value and the second portion of the pixel value to generate the Previously Presented pixel.

37. The method as in claim 36, wherein the absolute blend value is closer to zero than one to indicate closer proximity to the left pixel than the right pixel.

* * * * *

UNITED STATES PATENT AND TRADEMARK OFFICE

CERTIFICATE OF CORRECTION

PATENT NO. : 7,199,837 B2 Page 1 of 1
APPLICATION NO. : 10/008630
DATED : April 3, 2007
INVENTOR(S) : Edward G. Callway et al.

It is certified that error appears in the above-identified patent and that said Letters Patent is hereby corrected as shown below:

Column No. 15, Line No. 33, change “farther” to --further--

Signed and Sealed this

Twenty-first Day of August, 2007

JON W. DUDAS

*Director of the United States Patent and Trademark Office*